March 7, 1939.   P. KRANZ ET AL   2,149,968
ARTIFICIAL CHRISTMAS TREE
Filed Dec. 15, 1937
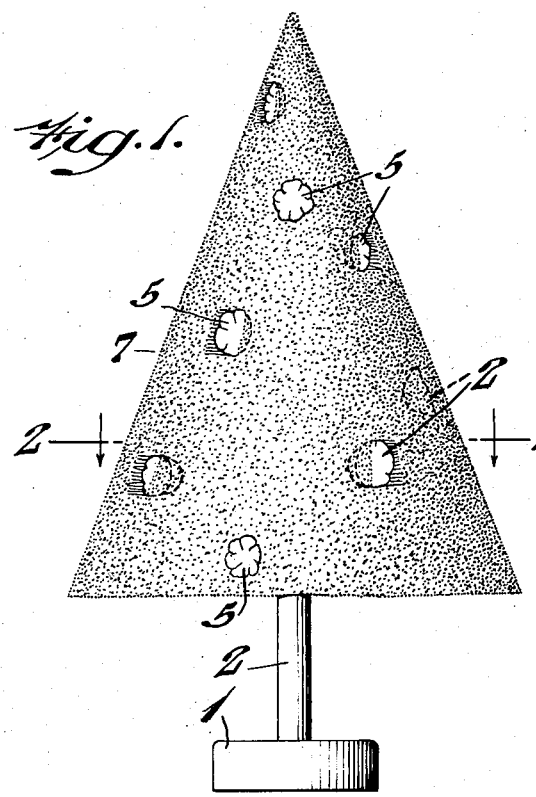
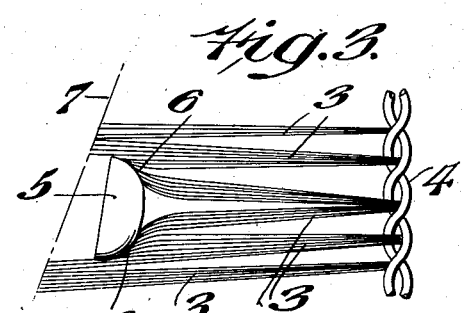
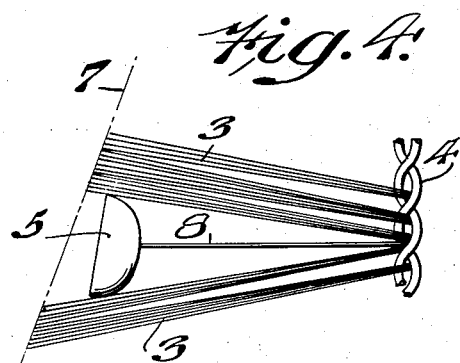
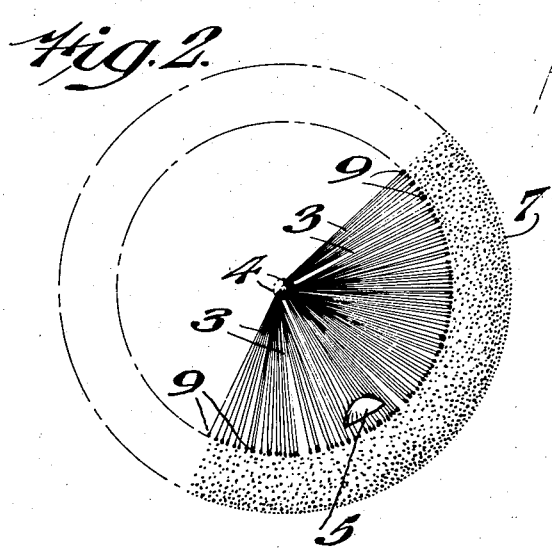
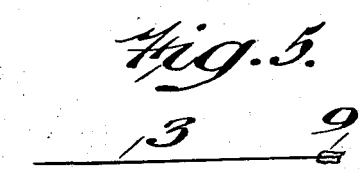
INVENTORS.
PHILIP KRANZ.
ALBERT P. SCHMID,
BY
ATTORNEY Patented Mar. 7, 1939

2,149,968

UNITED STATES PATENT OFFICE 2,149,968

ARTIFICIAL CHRISTMAS TREE

Philip Kranz and Albert P. Schmid, Philadelphia, Pa., assignors to Bernard Wilmsen, Philadelphia, Pa.

Application December 15, 1937, Serial No. 179,897

3 Claims. (Cl. 41—15)

Our invention relates to a new and useful artificial Christmas tree of the type used for decorative purposes around the Christmas season, and it relates more specifically to a Christmas tree of the general type illustrated in prior Patent Nos. 1,636,981, 1,696,974 and 1,798,991, the object of the present invention being to combine maximum decorativeness with maximum utility as well as economy and production.

Our invention still further relates to an artificial Christmas tree which, in addition to the conventional stem and branches to simulate the appearance of an evergreen, is also provided with additional ornamental objects representing flowers or the like, said flowers being, in our invention and as distinguished from Patent No. 1,636,981, set within the perimeter or conical plane of the tree so that said floral decorations are never exposed to outside contacts thus safeguarding against breakage or damage to their usually fragile and delicate structure.

In the accompanying drawing:

Fig. 1 represents a side elevation of the artificial Christmas tree embodying our invention.

Fig. 2 represents a fragmentary sectional view on line 2—2 of Fig. 1.

Fig. 3 represents diagrammatically, and on an enlarged scale, the manner in which the parts of the tree are assembled.

Fig. 4 represents a view similar to Fig. 3 showing a modified form of construction.

Fig. 5 represents, on an enlarged scale, a view in elevation of one of the bristles forming part of the tree.

Referring to the drawing in which like reference characters indicate like parts, our artificial Christmas tree includes the base 1 which may be a block of any suitable shape or size, or which may simulate the appearance of a flower pot. From the base 1 projects the tree trunk 2 which, at a certain distance above the base, merges with the stem 4 from which project radially and in an upwardly tapering manner, the bristles 3 which produce substantially the conical form best seen in Fig. 1. The fibers 3, which simulate branches, are suitably secured to the stem 4 in the manner shown in Fig. 3, or any desired manner. 5 designates a floral, decorative element formed of suitably colored and shaped tin foil or similar material, the decorative element 5 being adhesively secured at 6 to the surrounding portions of the branches or fibers 3 at a point well in advance of or within the extreme outer ends of the branches 3 so that the floral decoration 5 is set back with respect to the conical plane defined by the line 7. By positioning the decorative elements 5 within the extremities of the branches 3, the appearance of the tree is enhanced and the elements 5 are adequately protected against contact with exterior objects and hence against falling out or being damaged.

In Fig. 4 we have shown a modified form of construction in which the floral element 5 instead of being adhesively secured to the adjacent portions of the surrounding branches is carried by the stem 8 which is suitably connected to the stem 4 of the tree. In this construction it will be noted that the element 5 is also spaced inwardly from the outer extremities of the branches 3, all well within the conical plane defined thereby.

The bristles or fibers 3, which represent the branches of the tree, are preferably formed of resilient, elongated, narrow or thin strands which may be of vegetable or other fiber and are provided at their outer ends with enlarged portions 9 which may be colored to represent flakes of snow, or to represent other forms that may be natural to the particular type of tree represented.

Having thus described our invention, what we claim as new and desire to secure by Letters Patent is:

1. An artificial Christmas tree comprising a stem, bristles carried by said stem and simulating the branches of a tree, and decorative members adhesively secured to and disposed within the outer ends of said bristles.

2. An artificial Christmas tree comprising a stem, bristles carried by said stem and simulating the branches of a tree, and cup-shaped decorative members adhesively secured to and disposed within the outer ends of said bristles.

3. An artificial Christmas tree comprising a stem, relatively thin flexible bristles carried by and radiating from said stem to simulate branches, and floral decorations permanently secured to said tree, said decorations being disposed between and inwardly from the outer ends of said bristles.

PHILIP KRANZ.
ALBERT P. SCHMID.